United States Patent [19]

Mandelbaum et al.

[11] Patent Number: 5,544,246

[45] Date of Patent: Aug. 6, 1996

[54] SMARTCARD ADAPTED FOR A PLURALITY OF SERVICE PROVIDERS AND FOR REMOTE INSTALLATION OF SAME

[75] Inventors: Richard Mandelbaum, Manalapan; Stephen A. Sherman, Hackettstown; Diane R. Wetherington, Bernardsville, all of N.J.

[73] Assignee: AT&T Corp., Murray Hill, N.J.

[21] Appl. No.: 122,631

[22] Filed: Sep. 17, 1993

[51] Int. Cl.$^6$ ........................................ H04L 9/32
[52] U.S. Cl. ................... 380/23; 380/4; 380/24; 380/25; 235/379/380
[58] Field of Search ............... 380/4, 9, 23, 24, 380/25, 44, 46, 49, 50; 235/379, 380

[56] References Cited

U.S. PATENT DOCUMENTS

| | | | |
|---|---|---|---|
| 4,443,027 | 4/1984 | McNeely et al. | 283/83 |
| 4,734,568 | 3/1988 | Watanabe | 235/380 X |
| 4,742,215 | 5/1988 | Daughters et al. | 235/487 |
| 4,797,542 | 1/1989 | Hara | 235/380 |
| 4,816,653 | 3/1989 | Anderl et al. | 235/380 |
| 4,816,654 | 3/1989 | Anderl et al. | 235/380 |
| 4,877,947 | 10/1989 | Mori | 235/379 X |
| 4,910,773 | 3/1990 | Hazard et al. | 380/21 |
| 4,928,001 | 5/1990 | Masada | 235/380 |
| 5,036,461 | 7/1991 | Elliott et al. | 235/380 X |
| 5,148,479 | 9/1992 | Bird et al. | 380/23 |
| 5,225,664 | 7/1993 | Iijima | 235/380 |
| 5,267,315 | 11/1993 | Narita et al. | 380/24 |
| 5,288,978 | 2/1994 | Iijima | 235/380 |
| 5,317,637 | 5/1994 | Pichlmaier et al. | 380/25 |

*Primary Examiner*—Bernarr E. Gregory
*Attorney, Agent, or Firm*—Henry T. Brendzel

[57] ABSTRACT

A smartcard that allows different Service Providers to coexist on the smartcard with none of the Service Providers, nor the owner of the smartcard, having access to the files created for, or by, each of the resident Service Providers. The operating system of the smartcard includes a root directory that is owned by the smartcard's issuer/owner, and each Service Provider is a "user" that is installed by the issuer/owner. Each such user is provided with a subdirectory of the root directory, and within the subdirectory the user creates files and subdirectories with files, as the user deems necessary. The operating system prevents all users of the smartcard, including the smartcard's issuer/owner and the smartcard's holder, from accessing any files that are owned by any other user, when that user chooses to prevent such access. This power to exclude is effected through a password file that is owned by the user and which cannot be altered by any other user, including the smartcard's issuer/owner. Optionally, the smartcard's issuer/owner is given the power to erase all files of a given user. Connection is effected with a protocol which authenticates all parties to the connection. Thus, in a connection between the smartcard and a user, the smartcard determines whether the user should be granted access, and the user determines whether the smartcard is a valid smartcard. Authentication of the possessor of the smartcard may also be effected.

9 Claims, 6 Drawing Sheets

FIG. 1

PRIOR ART

SMARTCARD ADAPTED FOR A PLURALITY OF SERVICE PROVIDERS AND FOR REMOTE INSTALLATION OF SAME

BACKGROUND OF THE INVENTION

This invention relates to smartcards.

Advances in microelectronics have made it possible to put a vast amount of computing power in a small space. In fact, it is possible to effectively put an entire computer inside a credit card, creating thereby a "smartcard". Because of the tremendous processing and memory capabilities of the smartcard, it is expected that smartcards will replace conventional credit cards which, typically, serve to confirm the right of the card's holder to debit a given account. Smartcards will provide a higher level of assurance that the smartcard possessor is the rightful Holder. This will solve a major problem of conventional credit cards. Moreover, smartcards will be more than an "authorizer" to debit (or credit) an account. For example, they will "carry" preapproved credit.

To allow smartcards to fulfill their promise, Service Providers must feel secure that the computer within the smartcard cannot be employed for improper uses. A number of approaches have already been used to meet this need. First, smartcards are provided only with a power port and a controlled information pass-through port. Second, the computer embedded in the smartcard operates under control of an operating system which ensures that instructions sent to the computer do not carry out operations that are detrimental to the card's purpose and security guidelines; i.e., only instructions that read and alter permitted data areas are allowed. Third, the issuers of today's smartcards insist on populating the card on their premises and not through remote communication.

The memory in smartcards is large enough to hold the programs and data of a number of service providers. That is, there is sufficient memory to allow, for example, VISA, AMERICAN EXPRESS, and MASTERCARD to coexist on a single smartcard. Alas, smartcards have yet to be developed that, in a commercial sense, succeed in carrying the services of more than one Service Provider. It is believed that the reason for this state of affairs is a number of security problems have not been solved. One problem, for example, arises in connection with who is the card's owner and what powers does the owner have over all the files in the smartcards memory. Stated in commercial terms, the question is to what extent does the owner of a smartcard (who may also be a Service Provider) have powers over the smartcard that are inconsistent with the security that other Service Providers seek. This is a trust issue.

A second issue relates to remote provisioning. Particularly, it is undesirable to require the smartcard holder to have a service installed only by bringing the card to the provider. It is also undesirable to require surrender of the smartcard when one of the services on the smartcard is to be canceled. Rather, it is desirable and perhaps even essential for commercial success, to allow remote provisioning.

When the remote provisioning issue is solved, a third issue relates to the need to reuse space in the holder's smartcard as old services are canceled and new services are installed.

A fourth issue relates to the commercial conflict between competitive services, and the desire by some providers to restrict access by their customers to competing services.

SUMMARY OF THE INVENTION

The issues described above are resolved with an operating system that allows different Service Providers to coexist on a smartcard with none of the Service Providers, nor the owner of the smartcard, having access to the files created for, or by, each of the resident Service Providers unless authorized in advance.

The operating system of the smartcard, somewhat akin to the UNIX® (registered trademark of UNIX System Laboratories) operating system, includes a root directory that is owned by the smartcard's issuer/owner, and each Service Provider is a "user" that is installed by the issuer/owner. Each such user is provided with a subdirectory of the root directory, and within the subdirectory the user creates files and subdirectories with files, as the user deems necessary.

The operating system prevents all users of the smartcard, including the smartcard's issuer/owner and the smartcard's holder, from accessing any files that are owned by any other user, when that user chooses to prevent such access. This power to exclude is effected through a password file that is owned by the user and which cannot be altered by any other user, including the smartcard's issuer/owner. Optionally, the smartcard's issuer/owner is given the power to erase all files of a given user.

The operating system also includes means for digital signature-supplemented communication as well as for completely encrypted communication. This capability imparts confidence in remote communications, which permits remote provisioning, effective maintenance of a database that keeps track of all services contained in each smartcard, and re-provisioning of a smartcard in case of loss or general failure of the smartcard.

DETAILED DESCRIPTION

A number of smartcard operating systems are already known. One example is U.S. Pat. No. 4,816,654, issued to Anderl et al. on Mar. 28, 1989 having a hardware block diagram that is reflected in FIG. 2. The operating system described below has many similarities to that operating system and to the well known UNIX operating system. A brief description of some well known aspects of the UNIX operating system will help in understanding the smartcard operating system disclosed herein.

The UNIX Operating System

The UNIX operating system comprises a collection of files. Some are files that primarily contain information about related files, and they are called directory files or directories. Others are files that contain user data, and they are "normal" files. Also in the UNIX operating system, a user can be the "owner" of the file, can belong to a specified "group" recognized by the file, or can belong to "other". Each file contains a data portion that specifies the file characteristics, such as ownership, information access capabilities relative to the three types of users, etc. The owner of the file can change all file characteristics.

Architecturally, the first and primary file is a root directory file. The user who is the owner of this directory is, in effect, the owner of the entire operating system. This user can create other files which are pointed-to by the root file. These files, which can be other "directory" files as well as "normal" files, are considered to be "below" the root directory, in a tree-like structure.

In many UNIX operating systems, one of the directories below the root is named "etc.", and it has a file below it that is designated "passwd". The full address, or path name, of that file is "/etc./passwd" (the file "/" at the beginning of the path name designates the root address). The "etc." and the "passwd" files are owned by the system administrator, typically called "Root", who is the also the owner of the root directory. The "passwd" file contains an encrypted representation of Root's password, and Root's access to the operating system is allowed only after Root logs in by providing the password. The presented password is encrypted and compared to the encrypted password stored in the "passwd" file. When the comparison is favorable, the user is accepted and granted permission to access other files; i.e., the user is "logged in".

Figure 1:
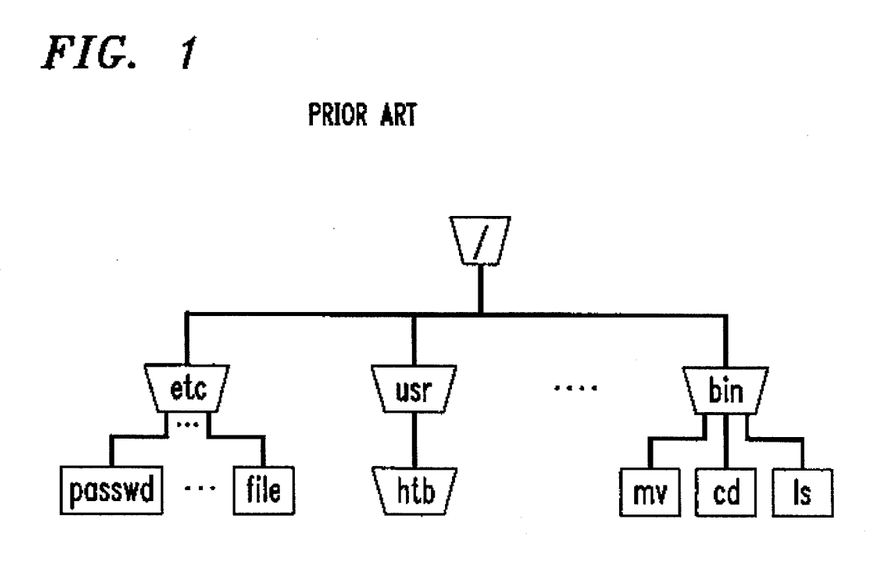
FIG. 1 depicts the structure of the UNIX operating system.

Multi-user capability is provided by allowing Root to create a subdirectory below the root directory and to assign ownership of that subdirectory to another user. Root can then install a password for that user in the "passwd" file and allow the user to enter the system at that subdirectory file when that user presents his/her password. The user has the ability to modify his/her own password, but only through a command provided by the operating system. That password resides in the system only in encrypted form and only in the "passwd" file. This architecture is depicted in FIG. 1.

The log-in process can be summarized as follows. A computer operating under the UNIX operating system begins by executing a loop that scans the computer's input port. When connection by a user is detected, control is transferred from the loop to a program that begins interactions with the user. The program sends a "login:" message to the user and waits for the user's response. The user identifies himself/herself, for example, by returning the string "htb", and that identifies the user to the operating system. The program continues with the challenge message "Password:" and the user must supply a password string. The program encrypts the password string and compares it to the encrypted password that is found in the "/etc/passwd" file for the identified user. When the match is positive, it is determined that the user is bona fide, and control passes to a file owned by Root (typically named ".profile"). That file sets various parameters for the user and passes control to another file that is owned by the user (typically also named ".profile", but this file is located in the directory owned by that user). Whatever instructions are found in the user's ".profile" file are executed, and the computer is placed in a loop, awaiting further instructions from the user.

Root is the owner of all files that comprise the operating system as well as of the "passwd" file. Therefore, Root can modify any and all files and is, therefore, a "super user". It is important to note that even files that are not owned by Root are nevertheless subject to Root's commands. Reason: Root has the power to change the "passwd" file as well as the files that control Root's capabilities generally. That capability gives Root the power to change the password itself and, therefore, Root can always make itself the owner of a file. Hence, it makes sense to let Root have all owner powers in the first instance. In short, Root has absolute control and total knowledge over all files in the system.

Aside from being able to log in (by providing the correct password), users are granted the ability to read files, write into files, and execute files—i.e., pass program control to files. (Without the power to pass program control to a specified file nothing can be done, for executing a program is noting more than passing control to a file.) Since Root has access to all files in the system, it follows that Root can read, write, and execute all files.

All system-provided instructions in the UNIX operating system are merely files that can be executed, and those files can be located in any directory—as long as the system knows where those files are found. As stated earlier, Root owns all those directories and all those files. Since Root controls the read and execute permissions of all those directories and files, it follows that Root can restrict anyone (including itself, if that were desired) from executing any file, simply by limiting the permissions of that file. That gives Root the power to create customized sets of files whose execution is blocked to particular groups of users. In other words, Root can create various restricted operating systems, or "restricted shells", that encompass less than all of the commands available on the system.

The Smartcard Operating System

The absolute power that Root has in the UNIX operating system makes it unsuitable for smartcards. While it is patently clear that providers such as VISA, MASTERCARD, and AMERICAN EXPRESS will not allow each other to be the Root, it is also quite likely that, absent demonstrably sufficient security means, they would not want anyone else to be the Root either. That is part of the problem that has been blocking the smartcard from enjoying the commercial success it deserves.

Figure 2:
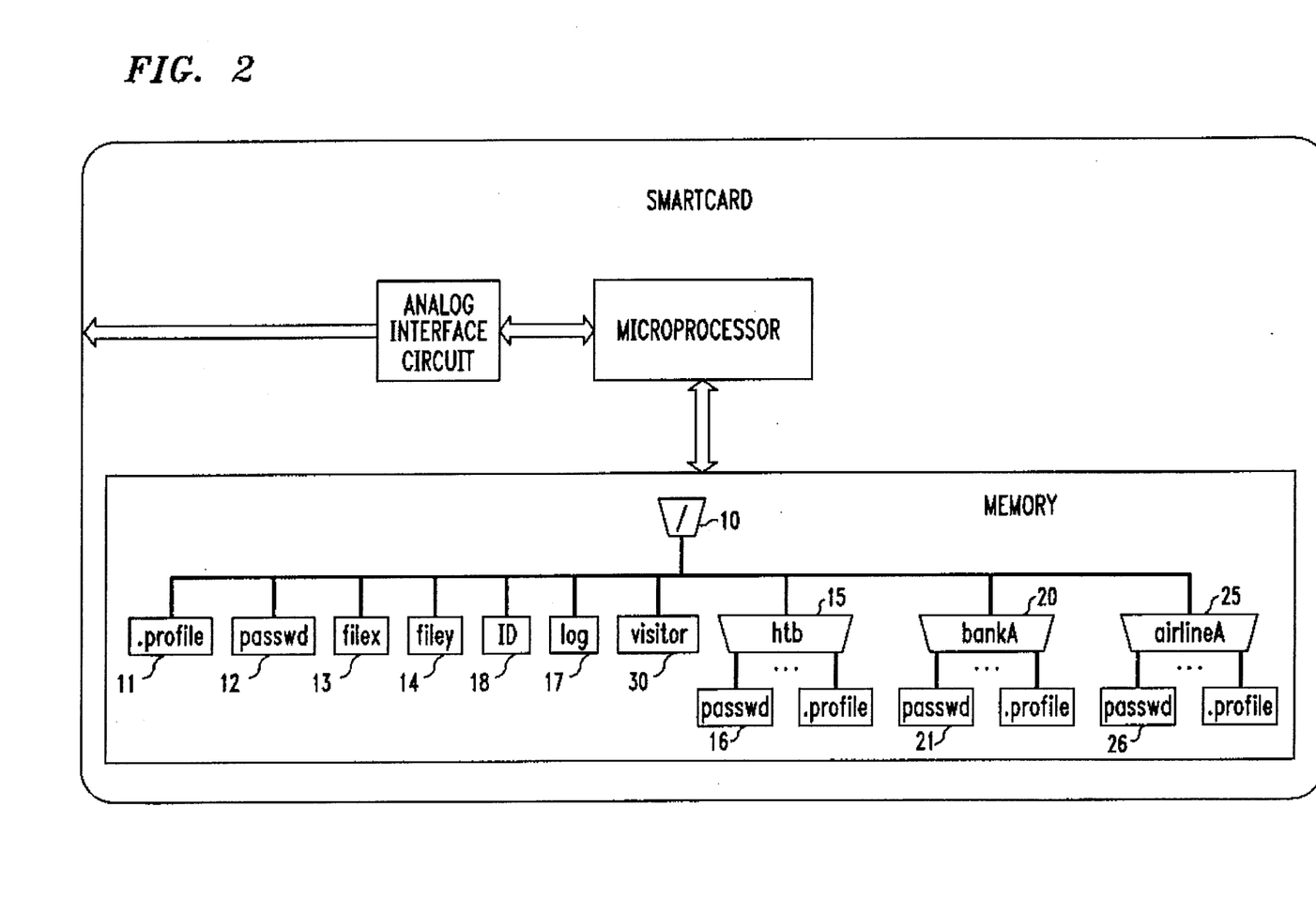
FIG. 2 presents the tree structure of a smartcard operating system embedded in the memory of the othserwise conventional smartcard.

FIG. 2 presents the otherwise conventional block diagram of a smartcard, and illustrates a file structure that responds to this sensitivity of Service Providers. According to the structure of FIG. 2, Root owns the root directory and any number of files (directory files or normal files) that it wishes to create. For example, FIG. 2 includes a root directory file 10 and below it there are the following Root-owned files: ".profile" file 11, "passwd" file 12, "log" file 17, "filex" file 13, "filey" file 14, and "ID" file 18. A number of subdirectories are also found below root, with each being used as the "HOME" directory of a user (Service Provider). For example, FIG. 2 includes a directory file 15, named "htb" (the smartcard's Holder), a directory file 20 named "bankA", and a directory file 25 named "airlineA". Each one of the directories also includes a "passwd" file (16, 21, and 26, respectively) below the associated user's HOME directory, as well as a ".profile" file. This placing of the password files has some advantages, but it is not a requirement. Importantly, ownership of each such password files is assigned to the user associated with that file and the directory above it.

It may also be advantageous to grant ownership of directories 15, 20 and 25 to the respective users.

FIG. 2 includes one additional important directory (and a user). That is the "Visitor" directory 30, which is the entry point for non-Service Providers who wish to interact with the smartcard.

The FIG. 2 file architecture is coupled to an operating system that differs from that of the UNIX operating system primarily in that the operating system of the FIG. 2 structure does not allow Root the ability to modify files that it does not own. To insure that this capability is not circumvented by Root, the operating system does not allow Root to modify some of the files that define the operating system (in a sense, Root does not own those files). One means for achieving the latter result is to encase those non-Root-owned operating system files in a read-only memory (ROM). At the very least, the ROM contains the commands/modules/files that effect writing to a file. More specifically, the writing to a file is restricted to whatever the owner of the file specifies (the owner of a file is, initially, the user that creates the file), and Root is treated as merely another user. Commands that effect writing to a file are operating system commands that, for example, move files, copy files, save files, change file attributes (e.g., ownership), and rename files. Other items that may be installed in the ROM, or more typically in a "write once" memory (because they are unique to each smartcard), are the Root password and the smartcard's ID information (i.e., files 12 and 18) The ID information may simply be an arbitrary string, or it may include the smartcard's Holder name. Including the Holder's name is probably preferred by merchants who will get the ID information. Actually, both the Root password and the smartcard's ID can be encased in the file that establishes the Root directory (i.e., in block 10). In FIG. 2 these are shown to be independent files, however, to more clearly illustrate the concepts.

One file-writing power that is granted to Root in some embodiments is the power to delete any file in its entirely (and in the process, effectively deleting any file that the deleted file points to). This includes directory files and normal files and it applies to files that Root owns and to files that Root does not own. Such a capability may be imbued in embodiments where memory space is to be reused when a given Service Provider is no longer providing services to the smartcard's Holder.

Another difference between the operating system of FIG. 2 and that of a standard UNIX operating system is that the former includes an encryption key pair that is installed in a file owned by Root (e.g., in "filex" 13), and that key pair is unique to each smartcard. The pair includes a private key, f, that is kept secret by the smartcard, and a public key, g, that the smartcard does not care to keep secret. Of course, both keys are initially known to the smartcard's owner/issuer, who is also the Root user (i.e., super user) of the smartcard, but Root need not keep the private key (and probably would choose to destroy that knowledge). This pair of keys can also be "burned" into an appropriate memory, such as the memory containing Root's password, or included in the file that defines the root directory. More about public key encryption is found below.

The fact that the password of a user's directory is stored in a file that is owned by the user is a key difference between the UNIX operating system and the operating system shown in FIG. 2. The fact that these passwords can't be read by anyone other than the files' owners permits storing the passwords in an unencrypted form. Combined with the restriction on writing, this file organization prevents Root from becoming the owner of any file (normal file or directory file), and thus prevents Root from circumventing the permissions set by the file's owner. This key difference allows one user's files to be completely opaque to Root as well as to other users. Thus, the FIG. 2 arrangement overcomes the "trust issue" between the providers of services and the smartcard's issuer/owner.

Transactional Security

The next issue that must be addressed is transactional security of the smartcard. This concept encompasses the measures employed by the smartcard's operating system and by the agreed-upon communication protocols to ensure that unauthorized transactions do not occur which would adversely affect the Holder or any of the Service Providers. This includes activities by Root, the Holder, any of the Service Providers, any Visitor user, or an interloper. (An interloper is a party that interjects itself into a communication session between a smartcard and another party and substitutes its messages for the true messages.)

One way to thwart interlopers is to construct messages that include a date and time stamp, with at least that portion of the message being encrypted. Alternatively, the entire message can be encrypted. Also, wherever necessary, the communication protocol can require a confirmation sequence (which differs from session to session) to be exchanged between the parties. It is also a good general approach to minimize the flow of sensitive information in the clear (i.e., without encryption). These techniques are employed in the log-in and communication protocols described below.

Encryption

The field of encryption is not new. What follows is merely a summary of a few encryption techniques that may be employed in connection with the smartcard disclosed herein.

As is well known, the "shared secret" approach to encryption calls for the two communicating parties to share a secret function, f. The party wishing to transmit a message, m, encrypts the message with the secret function to form an encrypted message $f(m)$. The encrypted message is transmitted and the receiving party decrypts the received signal by forming the function $f(f(m))$. The function f is such that discovering the message m from $f(m)$ is computationally very difficult, but applying the function twice recovers the original message; i.e., $f(f(m))=m$.

The "shared secret" approach to encryption is very good, but its weak link lies in the need to communicate, i.e., share, the secret function. If an eavesdropper obtains the shared secret during that communication session when the function is transmitted, then it is no longer secret.

In public key encryption, each party maintains one member of a pair of keys, f and g. More particularly, one party keeps one key (f) secret, but makes the other key (g) known to all. Thus, the key g is "public" and the key f is "private". The pair, f and g, is such that 1. $g(f(m))=m$;
2. even when g is known, the function f cannot be determined; and
3. it is computationally very difficult to determine the message m from $f(m)$.

Whereas the public key approach solves the key distribution/administration problem described above, it does have a disadvantage in that public key encryption and decryption is slower (requires more computation time) than the "shared secret" approach.

As it relates to smartcards, speed of communication has different levels of importance, based on the kind of party that is communicating with the smartcard. With respect to the smartcard's issuer/owner and the service Providers, low speed is not a major disadvantage because it is expected that such communication will be rare and, therefore, processing time is not "of the essence". In communication with others, however, (i.e., merchants that log in as the Visitor user), speed is important.

The speed issue can be resolved, where necessary, by combining the "shared secret" approach with the public key approach. That is, when communication is initiated, the public key approach may be used to communicate a temporary "shared secret" between the smartcard and the merchant. Specifically, the party having the public key chooses a "shared secret" and communicates it to the party having the private key. Thereafter, the faster "shared secret" approach is used to encrypt the entire messages.

Alternatively, a certification approach may be used (using the shared secret). In a certification approach, the message is sent in the clear, and is appended, or "signed", with a "digital signature". A "digital signature" is a hashing of the message (e.g., adding the ASCII codes of the characters in the message, in a selected modulus) that is encoded. Of course, in applications where it is assured that an interloper cannot substitute the true data with false data the information can be sent in the clear (probably, following a verification process using the public key).

Use of the public key approach solves most of the key-administrations concerns. It still leaves the question of the initial knowledge of the public key by the party wishing to communicate with the smartcard; but that is a non-problem since the smartcard itself can provide that information.

Log-in by Root and Installation of a Service Provider/ User

Figure 8:
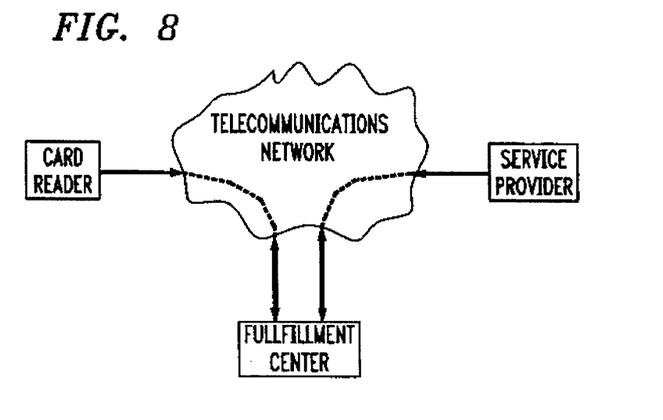
FIG. 8 depicts an arrangement for remote provisioning of smartcards using the telecommunication network.

Because encryption ensures secure communication, the smartcard's issuer/owner can have confidence in remote installation of services. Of course, the issuer/owner (i.e., Root) must first log in into the smartcard. A protocol for the log-in is presented in FIG. 3, and a protocol for service installation process is presented in FIG. 4. The physical, remote, connection that is possible with the smartcard disclosed herein is shown in FIG. 8.

Figure 3:
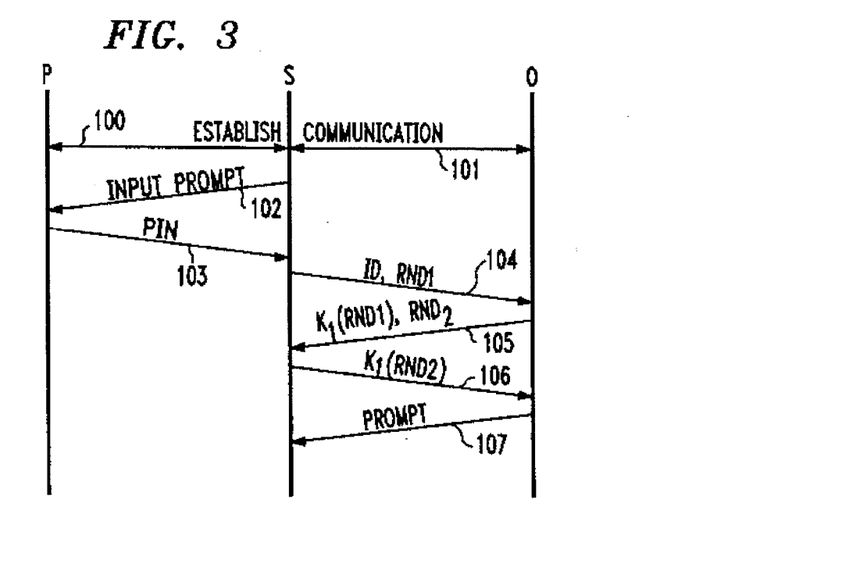
FIG. 3 shows a log-in protocol between a smartcard and its issuer/owner.

As depicted in FIG. 3, the process begins with the smartcard's possessor (P) being authenticated as the bona fide Holder (H) of the smartcard (S). As shown in FIG. 3, the process begins with a prompt from the smartcard, and an entry of the possessor's PIN (Personal Identification Number) into the smartcard. The use of the smartcard's processing power to authenticate the possessor has an advantage in that is requires no communication of the PIN string to any equipment that might capture the PIN. Even in applications where P and S are at a merchant's premises it is possible for the merchant to possess a stand-alone piece of equipment that interfaces with the smartcard in a secure manner. This equipment may be battery operated, with a keyboard and a display, and certified to include no other ports, no processor, and no writable memory. In operation, P would insert S into the stand-alone equipment, input the PIN via the keyboard, and the smartcard would determine whether the PIN is correct. It would then output an "OK" message through the display, if appropriate.

When such stand-alone equipment is unavailable (or when the communication is remote as, for example, when a "dumb" card reader is used at the possessor's home), the submitted PIN is processed in the smartcard and the "OK" message from the smartcard (to the merchant's equipment) is "time stamped" and encrypted. This suggests that P's actual confirmation as H may be postponed until after the appropriate encryption keys are established and date and time information is imparted to S (this is not the approach shown in FIG. 3).

Returning to FIG. 3 generally, after the bona fide of H is established, S verifies that the user logging is a valid user and the user confirms that S is a valid smartcard. More specifically, the protocol of FIG. 3, in its entirety, proceeds as follows:

a. S prompts for an input and P provides a PIN string. (Within the smartcard, the PIN resides in a Root-owned file that is open for the Holder to modify, for example, file 14 in FIG. 2.) S compares the provided PIN string to the stored PIN string and, if the comparison is positive, P is confirmed as H.

b. Once H is confirmed, attention can turn to the communication between S and O. S identified itself to O by providing its ID information and a password challenge in the form of a random string, RND1.

c. O encrypts RND1 with O's password to form string $K_1(RND1)$ and returns it to S. This form of password response obviously changes from session to session and ensures that the true password of O is not snared by an interloper. There does remain the question of where O keeps the passwords of all the smartcards that it owns, and how secure such a database is. However, there is actually no need for O to keep a database of passwords. All that O needs is a single seed string which, when processed with the data supplied by S, yields the smartcard's password. That data is the ID information.

d. Since the string submitted by the smartcard will always be either the same or unknown to O beforehand, an additional authentication step may be desired to ensure that the initial string (ID, RND1) is not a replay of a recording. This is achieved by O sending a challenge message, RND2, to S comprising, for example, its ID and a random string.

e. Based on the ID contained in the RND2 string, S determines that O is the user, obtains the necessary key (e.g. O's password), and decrypts $K_1(RND1)$. When the decryption results in RND1, S determines that O is bona fide.

f. Thereafter, S encrypts string RND2 with S's Root password and forwards the resultant string, $K_1(RND2)$, to O.

e. O decrypts the $K_1(RND2)$ response, and if the resulting string is RND2 then O is satisfied that S is valid. This ends the log-in process, with O presenting a prompt to S and standing ready to accept requests for service.

It may be noted that the "log-in" process described above appears to be different from the familiar log-in process where the computer into which access is disred controls. The computer asks for an initial identification of the user, and then asks for a password. Based on that initial identification, the computer knows what password to expect. Here, the smartcard appear to be in control, in the sense that it initiates the communication (with O); but instead of asking for an initial identification—to get information—, it provides information—the ID and RND1. That raises the question of whether the response from O is the initial identification, or the password; and if it is the password, then how does S know whether the password is correct. The answer is that the response from O serves three purposes: it identifies itself in the sense of the initial identification (by the ID contained in RND1), it authenticates itself by using the correct key to encrypt RND1, and it challenges S by RND2 to be returned in an encrypted mode.

Figure 4:
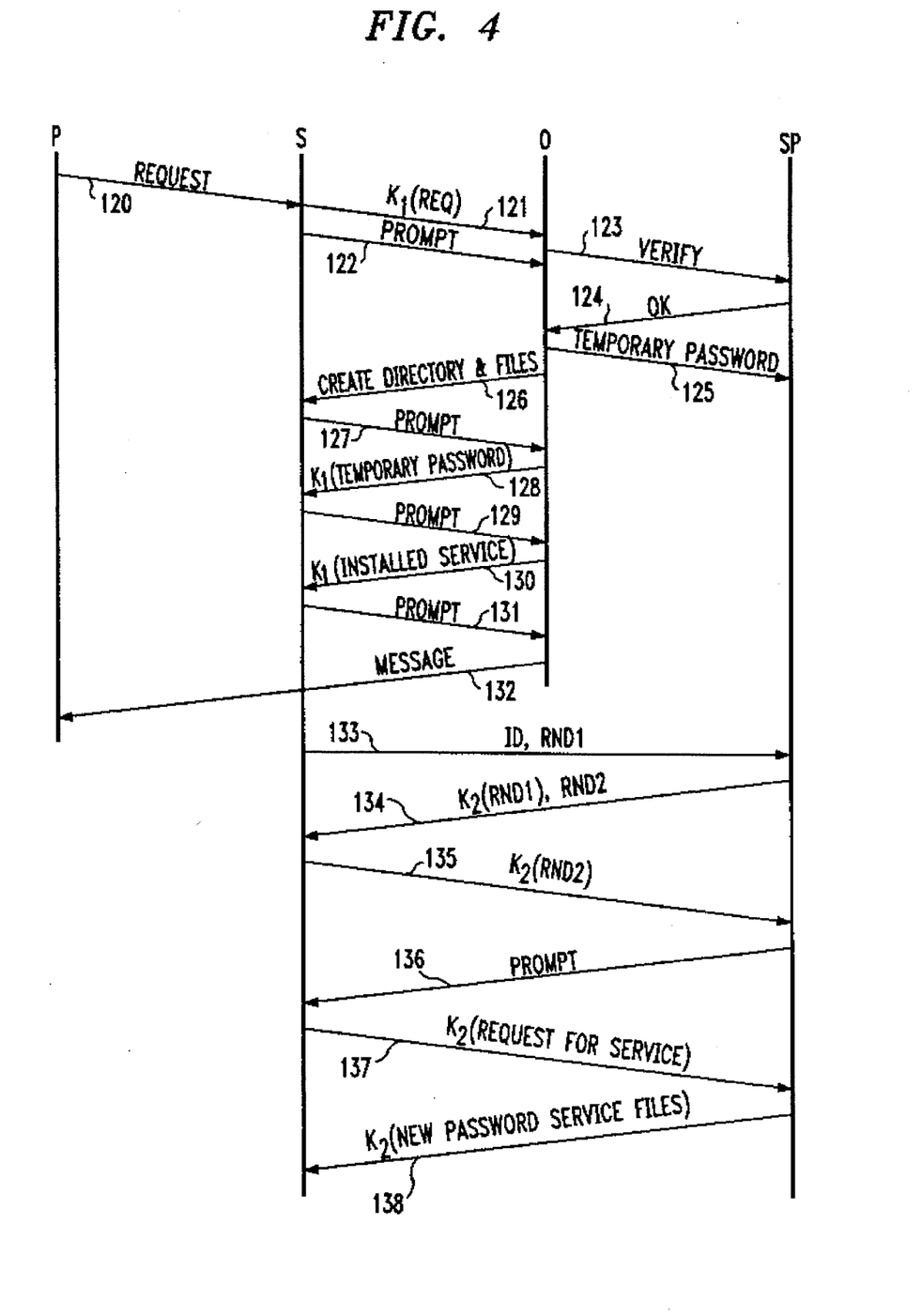
FIG. 4 illustrates a protocol involving a smartcard, the issuer/owner and a Service Provider.

Once O is logged in, H can communicate a request for installation of a service offered by a Service Provider (SP). The communication regarding the particular service requested to be installed by O may involve interaction with a human, but it can also be automated. For example, H can communicate to S the service that is desired, and S can communicate with O. FIG. 4 presents a protocol for installation of service.

a. H forwards a service request to S.

b. S encrypts the request and forwards it to O. The electronic communication between O and S can be encrypted with the private key member of the public key within S, with S sending its public key to O. Alternatively, the communication can be encrypted with a "shared secret" of the smartcard. The Root password may be selected for the latter, or a temporary "shared secret" can be offered by O to S (using public key encryption, as described above). In FIG. 4, the Root password is used for encryption, creating the request string $K_1(REQ)$.

b. Knowing the desired service, O contacts SP to verify that SP consents to offer service to H.

c. If provision of service is agreeable to SP, O selects a temporary password, informs SP of that password (probably through encrypted communication), and proceeds to create in S a user subdirectory and a password file for SP.

d. When the password file is set up for the SP user, the temporary password is sent to S (communicated in encrypted manner, as described above) and ownership of the directory and the password file is transferred to SP (this password serves as the "shared secret" key in the very first communication session with SP). Also, the rest of the application software that SP requires can be installed at this time, with O transmitting those files in encrypted mode. Alternatively, it may be arranged that no application software is installed by O.

e. At this point H is informed to contact SP for a final set-up.

h. H sets up a communication path between S and SP, employing a log-in sequence as shown in FIG. 3 but using the temporary SP password as the encryption key.

i. Once the log-in to SP is established, S sends out a request for service, and SP responds by installing a new password, as well as data and whatever files are necessary which were not installed by O. This completes the service installation process.

Provision of Service by a Service Provider

As indicated above, a Service Provider is simply a user having an assigned directory in the smartcard. The Service Provider logs in when the Possessor establishes communication between the smartcard and the Service Provider. As before, there are three elements to the log in protocol:

(1) SP wishes to establish that P is H, (2) S wishes to determine that the logged in user is the true SP, and (3) SP wishes to determine that it is communicating with a valid S.

Figure 5:
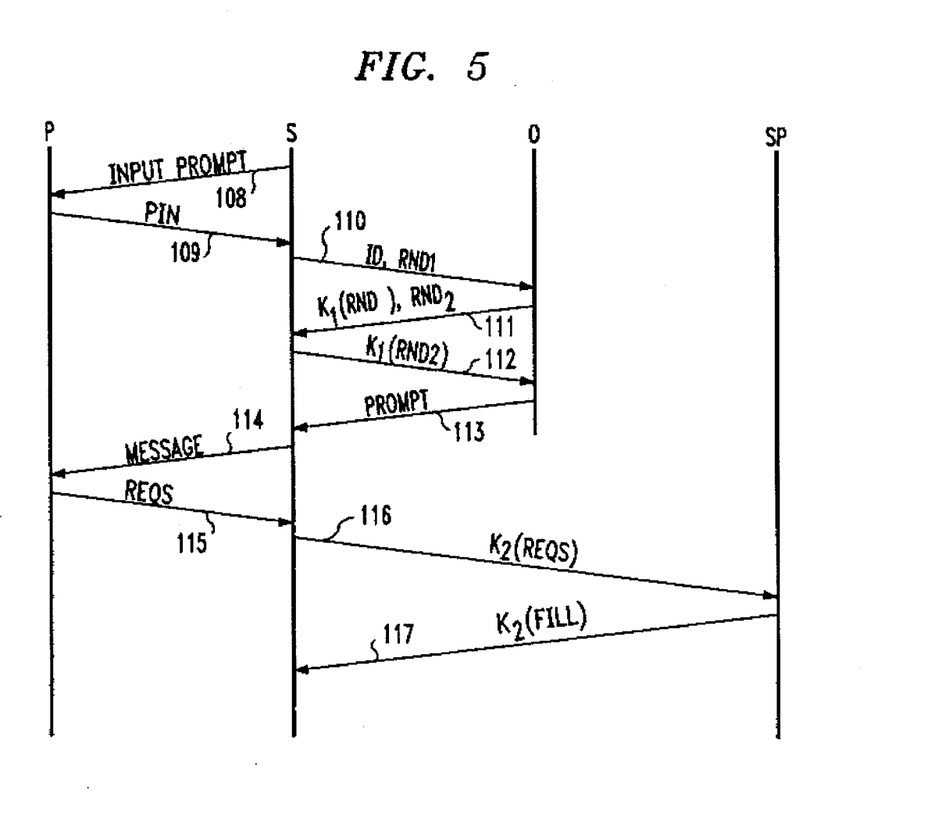
FIG. 5 presents a protocol for a smartcard obtaining services from a Service Provider.

These three elements are carried out in the protocol disclosed in connection with FIG. 3. Only after a successful log-in, can a service request be advanced. A service request may comprise, for example, H requesting SP (e.g., a bank) to install "money" into S, filling the "electronic purse" of S. The filling of the electronic purse may simply require installing a value in a file owned by SP. This is shown in the flowchart of FIG. 5.

Interaction with Merchants

Figure 6:
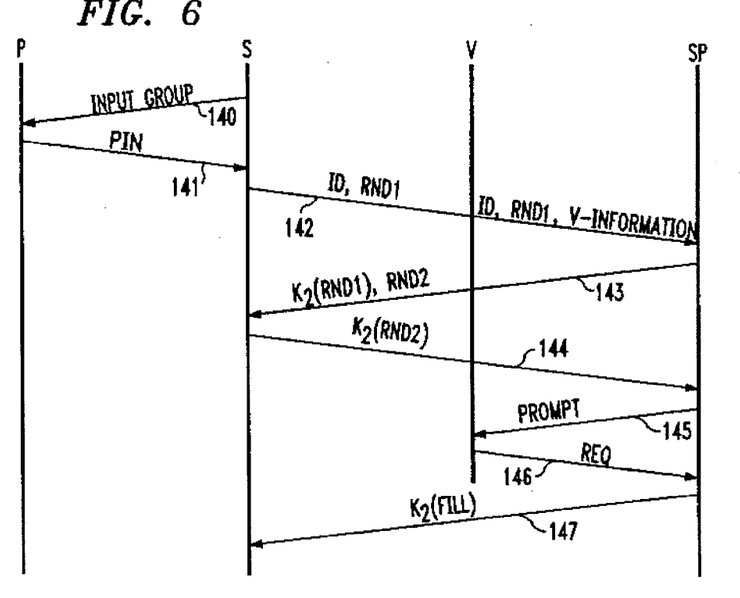
FIG. 6 presents a protocol involving a smartcard, a Visitor user and a Service Provider.

It is expected that, by a wide margin, the smartcard will mostly interact with merchants who are Visitor (V) users. The arrangement disclosed above permits such interaction in two ways: direct interaction between the smartcard and a merchant, and a three way interaction involving the smartcard, merchant and the Service Provider. The protocol for the latter approach, shown in FIG. 6, may be as follows:

a. P sets up communication between S and V (by handing S to V or by remotely connecting S to V).

b. S prompts for an input and P provides the PIN string. When that checks out, S determines the P is H and proceeds with 'the standard "log-in" sequence, sending its ID information and RND1.

c. V sets up a communication path with SP, identifies itself to SP, and relays the ID information and RND1.

d. Given the ID information, SP determines its password (perhaps also using a seed string combined with processing) and encrypts RND1 with that password. The resulting string, $K_2(RND1)$, is sent to S, together with a random string RND2.

e. S determines whether SP used the correct password in forming $K_2(RND1)$ and, if the conclusion is positive, encrypts RND2 and forward the result, $K_2(RND2)$, to SP.

f. When SP confirms that S used the correct password to encrypt RND2, it sends a prompt to V to inform the merchant that V can proceed to request usage of S.

g. V requests action from SP (such as deleting a value from H's account with SP, or such as modifying a value in a file residing in S and owned by SP.

h. SP fills that request and, if necessary, sends an appropriate command to S, encrypted with the SP password.

When it is desired to have the smartcard interact directly with the merchant (or a merchant in concert with the merchant's bank, or some other entity that provides a service to the merchant and stands "in the shoes" of the merchant) a mechanism needs to be established for allowing parties who do not have a pre-established relationship with the smartcard to log in into the smartcard. The "Visitor" user directory serves that need, and that user has no password. The Visitor user is, therefore, a very insecure user, so its access must be strictly controlled.

One question that needs to be answered, for example, is whether such a Visitor user will have access to application files (programs) of only the Service Provider specified by the merchant, or to application files of all Service Providers.

If access is to be granted to application files of all Service Providers, then the simplest arrangement is for Root to establish a Visitor user directory with no password and with a restricted shell which allows the Visitor user to execute only a limited set of operating system commands; i.e., with the variable PATH set up to contain one directory owned by Root (which includes only few operating system commands) and the SP subdirectories which contain the executables to which the SPs wish to grant execution access to Visitor users.

Figure 7:
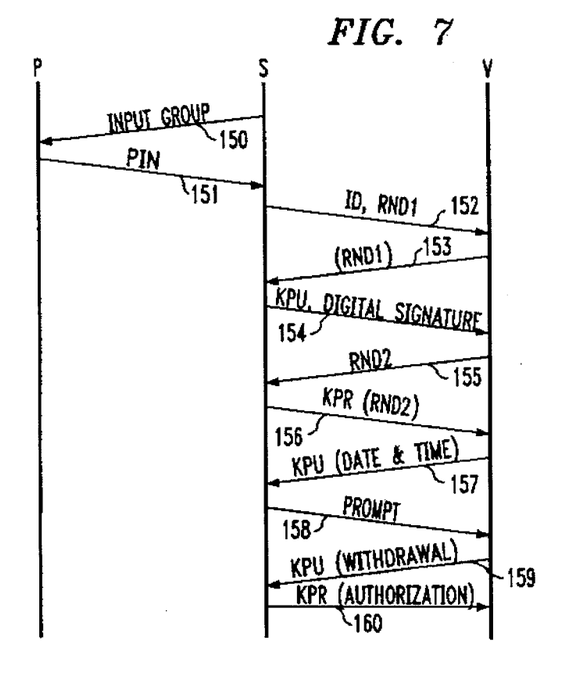
FIG. 7 presents a protocol between a smartcard and a Visitor user, without connection to a Service Provider

If access is to be granted to application files of only a specified SP then, of course, that SP must be specified and means must be provided to include only the executables of the specified SP. Again, this is easily accomplished with a restricted shell, where the PATH variable includes the necessary subdirectory of the specified SP. The protocol, depicted in FIG. 7, may be as follows:

a. S prompts for an input and P provides the PIN string. When that checks out, S determines the P is H and proceeds with the standard "log-in" sequence, sending its ID information and RND1.

b. Since V does not have any passwords, it merely returns the string RND1.

c. By this response S recognizes that the user is a Visitor user and sends out its public key, $K_{pu}$. (The public key could have been sent as part of the ID information.) At this point S also sends a "digital signature" that is derived from a message that contains the public key, the ID information and RND1. Similarly, S can send an encrypted string that constitutes a proposed "shared secret" (not shown in FIG. 7). The digital signature is encrypted with the public key.

d. V deciphers the "digital signature", using the provided public key. If the deciphered "digital signature" matches the appropriate string then V sends out RND2.

e. S encrypts RND2 with its private key and responds with $K_{pr}$(RND2).

f. V decrypts this message with $K_{pu}$ and if V obtains RND2 then V is satisfied that it is communicating with S.

g. V sends time and date information to S, encrypted with $K_{pu}$, and S returns a prompt.

h. V transmits a request to S (identifying the action that V seeks and the SP that is to be employed), also encrypted with $K_{pu}$, and S responds with an authorization to contact the specified SP. The authorization is encrypted with the private key, $K_{pr}$.

Typically, the merchant wants to receive funds that belong to H in exchange for goods or services provided by the merchant. As described above, it is quite possible for a Service Provider, such as a bank, to install an "electronic purse" that will hold a value. This value is in a file owned by the Service Provider.

The merchant needs access to this value file, and SP (in concert with H) is willing to grant access to this file, but only in a very limited and strictly controlled way. Thus, SP creates a file with a prescribed name that is expected by the operating system, populates this file with a value, and a specific operating system command (that not owned by Root) accesses the file and deducts a sum from the value found in the file.

Figure 9:
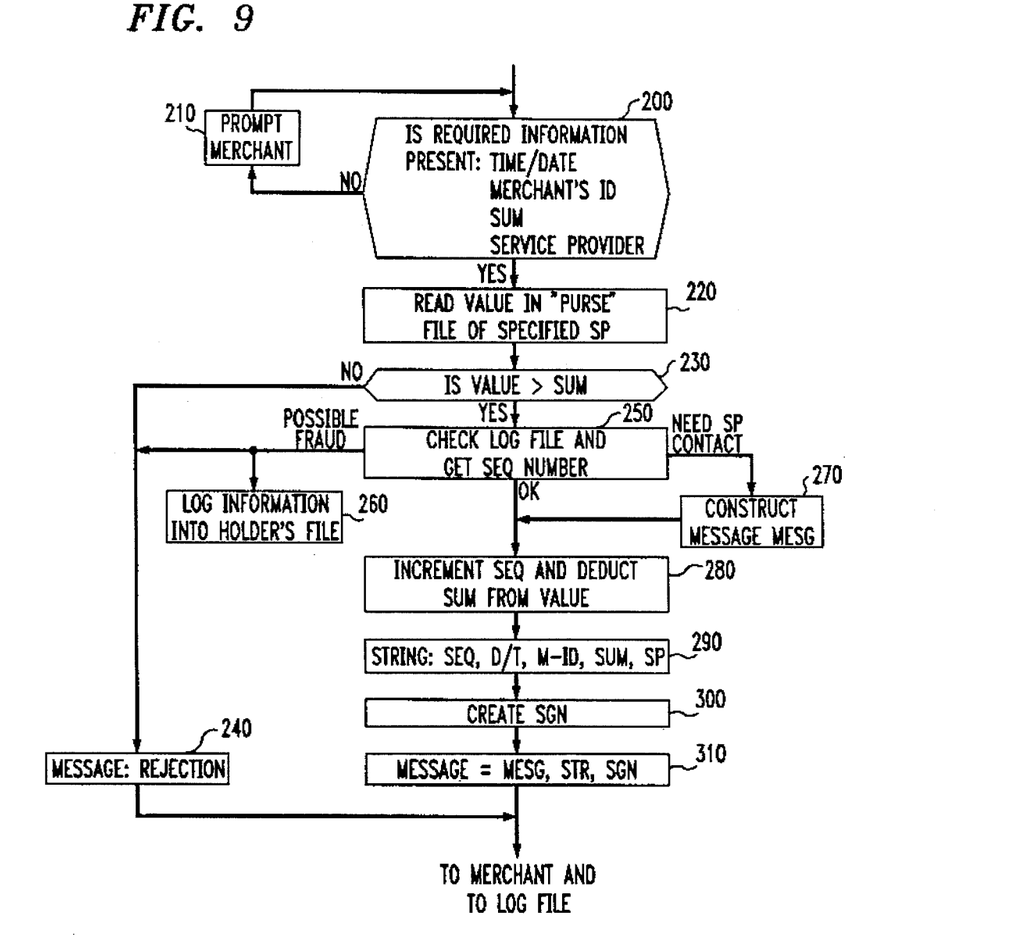
FIG. 9 presents a flowchart of an operating system command for drawing upon a value stored in a service provider's file.

A flowchart of such a command is illustrated in FIG. 9. The command starts at block 200 by perusing through a file (of a proscribed name) in the Visitor user directory. The file must contain four entries, separated, for example, by a newline character, and the operating system assumes that the four entries comprise a)date and time, b)merchant's ID, such as name address, and perhaps a code, c)the sum of money that is to be deducted, and d) the Service Provider whose "electronic purse" is to be used.

When that file does not exist or doesn't have the required number of entries, control passes to block 210 which informs the merchant (Visitor user) of the deficiency. When the file does exist, the command reads the value in the "electronic purse" file of the Service Provider (SP) in block 220. This file is a file that has a prescribed name. Block 230 evaluates whether the sum that the merchant wishes to withdraw is greater than the value in the electronic purse. If it is, control passes to block 240 which constructs a rejection message and forwards it to the merchant and to the log file within the smartcard. When the sum is lower than the value, control passes to block 250 which checks the log file for various indicia of fraud. This may be a separate command that is called by the command being executed. As depicted in FIG. 3, block 250 can result in three types of outputs: one that suggests a potential fraud condition (e.g., this merchant has used the smartcard more than a prescribed number of times within a preselected time interval, the date and time given by the merchant is earlier than the latest time found in the log file, etc.); another that responds to a threshold file provided by the SP which directs the merchant to conference the SP to the transaction; and the third that indicates a normal condition.

The potential fraud condition is handled by information being stored in the Holder's log file (block 260) and control then passes to block 240. The information stored identifies the merchant, what was attempted to be withdrawn, the reason for the rejection, etc. This provides the Holder with the information necessary to interact with the issuer/owner of the card and with government authorities, as necessary. If desired, the smartcard is disabled with a fraud condition is suspected.

When a threshold set by SP is exceeded (e.g., SP desires withdrawal authorizations in excess of $1,000 to be granted "in real time"), a message is constructed in block 270 and control passes to block 280.

Block 280 is also arrived at directly from block 250 when a normal condition is indicated. Block 280 increments the sequence number found in the smartcard's log file and deducts the sum desired by the merchant from the amount in the value file. Thereafter, block 290 creates a string that comprises the new sequence number, the date and time, the merchant's identification information, the sum, and the SP. Block 300 creates a digital signature of the string and block 310 creates a message that comprises the message constructed in block 220, the string constructed in block 300, and the digital signature. Finally, that message is sent to the merchant and to the smartcard's log file.

The merchant's equipment will do one of two things. When a message to conference SP is found to be present, the merchant's equipment connects itself to SP and forwards the message created in block 310. The merchant can then get immediate credit for the sum (provided, of course, that based on the signature the message is concluded to be valid). When the message received by the merchant does not include a message constructed by block 220, then the merchant can simply store the authorization string, collect such authorization strings over a chosen time interval (for example, the entire work day), and then forward the authorization strings to the appropriate SPs.

The authorization string is shown encrypted with the private key of S, but it can also be encrypted with the password of the specified SP. The authorization string must be robust enough to ensure that the merchant does not merely duplicate it a number of times and send it to SP. This can be accomplished in a number of ways, including having the date and time stamp, having an indication of the "before" and "after" values in the value file, having a sequence number supplied by S, etc. Since this authorization string is not decipherable by V and hence unalterable, security is maintained.

Smartcard Issuer/Owner as a Service Center

One aspect of the arrangement disclosed herein is that the smartcard's issuer/owner (O) has a general knowledge of, and control over, the service providers whose "applications" are present on the smartcard. First, O controls the establishment of a Service Provider's directory. Second, O can delete any directory at the holder's request, or whenever O gains access the smartcard (with, or without, the holder's consent). Third, O is the only party that knows the identity of all the Service Providers who share the smartcard, and various particulars about those Service Providers. Fourth, through the operating system's design, O can control the amount of memory that each Service Provider has access to, and thus can control the number of Service Providers that can "coexist" on a smartcard. Fifth, O can define a Service Providers grouping for particular types of transaction. Sixth, for the privilege of being on the smartcard O can charge each such Service Provider in proportion to the space occupied by the Service Provider.

As can be appreciated from all of the above, a number of benefits accrue from this arrangement. One that hasn't been mentioned before is that O has the power to "fix" a defective card and reinstall all of the services on it (typical power of an owner). Conversely, O has the power to delete all directories. This latter power is exercised when it is determined that a security breach has occurred.

With regard to security, there are four forms of attack that need to be considered: one is when an interloper tries to become Root, another when the interloper tries to become a Service Provider, a third when a party (Root, a Service Provider, an interloper, a Visitor, or the Holder) tries to do more than is permitted, and a fourth when the possessor is not the bona fide Holder.

With respect to the first form of attack, it is the Root password which is the first and primary sentry. It is an effective sentry in that the operating system is set up to completely disable the smartcard when a log-in as Root is attempted but fails. For example, all directories can be erased.

An attempt to log in as a Service Provider should be only slightly more forgiving. Thus, it can be arranged for a counter to keep track of failed attempts to log in as a Service Provider. When the number of failed attempt exceeds a preselected value (for example, 4) the smartcard again disables itself. In such situations it may be desired to direct the smartcard disablement only to the directory of the Service Provider who was the object of the attack, or to all of the Service Provider directories, but not to the Root directory.

As stated above, the most numerous contacts with the smartcard will be by Visitor users. While these contacts need to be flexible, they also need to be vigilant. Whereas in the UNIX operating system an attempt to execute a command that is not found in the PATH results in a benign message, the smartcard needs to monitor these attempts to access impermissible commands. Again, a counter can be employed and when a preselected count is exceeded, communication with the Visitor can be terminated, a message stored in the smartcard, and the card disabled to everyone except the Holder. The message, which would be stored in the 5holder's directory, would comprise the particulars of the aborted transaction. Similar actions would be taken if the Holder attempts to execute impermissible commands, but the diagnostic message would then be written to a Root-owned file.

Another security measure might even involve valid transactions by the Visitor. As described above, one of the files owned by Root is a log file, which maintains a record of all transactions carried out by the smartcard. This file can be checked to disallow a particular Visitor user, or all Visitor users, when particular circumstances appear to be present, such as too many transactions by one visitor in a given time interval, too many transactions in a given time interval, etc.

A slightly different security problem manifests itself when the parties making contact with the smartcard are OK, but it is 'the possessor of the card who is the problem. Here, it can easily be assumed that the parties interacting the smartcard would like to cooperate in the prevention of the smartcard's use; at that point, and henceforth. This can be accomplished in a number of ways. For example, when, during the log-in sequence it is determined that the D provided by the possessor is wrong (because, for example, the smartcard is a stolen one), the merchant can execute a command that writes a message to a file belonging to Root and disables the card. In such an event, the only way to recover the card is to contact Root. When Root reads the diagnostic message in its file, a determination can be made whether the Possessor is in fact the true Holder or not, and proper action can be taken.

Alternatively, the merchant's equipment can automatically connect the smartcard to the card's issuer/owner. The owner first disables the smartcard and then proceeds to interact with the smartcard's possessor to determine whether the possessor has authority to possess the smartcard. If the possessor does have that authority, the issuer/owner re-enables the smartcard.

Given the above-disclosed structure and operating system of the smartcard, it is clear that the issuer/owner who installs all services found on the smartcard has knowledge of those services. That is, although the issuer/owner does not have the power to delve into files owned by the various Service Providers (even though it is the Root owner of the smartcard) the issuer/owner nevertheless knows of the specific Service Providers that are resident on each of its smartcards. This knowledge can be maintained in a database owned by the issuer/owner (although each smartcard can also maintain that information about itself).

In the event a smartcard is lost or destroyed, a new smartcard can be issued to Holder with all of the Service Providers installed ab initio. The only items that cannot be recovered are the data files created by the various users in the old file and the Service Providers' passwords. As with initial installations, a set of temporary password files can be installed. The Service Providers can then be contacted by the issue/owner to inform them of the temporary passwords, and the Holder then contact the Service Providers to modify the passwords and to populate the necessary files in their respective directories.

Audit Trail

As indicated above, Root can maintain a log file and store therein a record of each transaction. This file can then be used to keep tract of various thresholds that the Holder, or the Service Providers may wish to impose.

Excessive uses of a smartcard can be an indication of fraudulent use. As indicated above, such uses can be detected through careful scrutiny of the log file and stopped.

Another use of the log file relates to perfectly valid uses. For example, a credit-providing Service Provider may wish to be informed in "real time" whenever charges over a certain limit are incurred, while allowing "batch" transmissions from the merchants (perhaps at the end of the work day) for all smaller transactions. In connection with the electronic purse of a smartcard, the Holder may instruct the smartcard to automatically contact the Holder's bank when the money value in the smartcard is below a certain limit, and transfer some additional funds into the smartcard.

Still another use of the audit trail relates to dispute resolution. If a merchant asserts that the smartcard was used to obtain some goods or services and the Holder disputes the assertion, the log file can be used to resolve the dispute.

Cooperation Between Service Providers

It is quite possible for service providers to form cooperative alliances. Such alliances can specify various activities which are carried out in the smartcards whenever the smartcard is accessed, or when the smartcard is accessed by a particular user. The number of such possibilities is limitless, and the example below is merely illustrative.

Assume, for example, that company Z employs traveling salespersons who, expectedly, need to purchase gasoline fairly regularly. Z is likely to contract with O to issue a smartcard for each of Z's salespersons (Holders) and request O to install Z as a Service Provider and G as the gasoline provider. Sometime later, A may reach an agreement with bank B as a Provider of credit for the salespersons. That service can be remotely installed into all of the smartcards belonging to the salespersons by, for example, obtaining the cooperation of G.

Specifically, Z can request G to install a request for communication with O whenever a smartcard interacts with G and found to have A as a user but not B as a user. All that G needs to do is send the appropriate command when the right kind of smartcard is logged into G.

The above disclosure speaks of "smartcards" but, actually, in connection with the invention disclosed herein, what we think of is any personal information device that is intended to primarily accompany a person wherever that person goes. Thus, the intent of the claims that follow is for the term "smartcard" to encompass all apparatus that is designed for personal use and is intended, at least in some of its functions, to carry information about a person. This clearly includes, for example, cellular phones and personal communicators. They already have the electronic means necessary to enable implementing this invention (e.g. processors), and the current expectation is that people will carry these electronic apparatus on their persons, much like people carry conventional credit cards.

What is claimed is:

1. A multiple-application smartcard in connection with which there is a party that is an issuer/owner of the smartcard, a party that is a holder of the smartcard, and a service provider that accesses the smartcard, the smartcard comprising:

a microprocessor, a memory coupled to the microprocessor, a plurality of files in said memory which combine to form an operating system for the microprocessor, which operating system includes a tree-like file structure;

a plurality of executable files executed in said microprocessor, forming part of the tree-like structure and each having file characteristics that are controlled solely by said issuer/owner, which files are executable in the sense that, when referenced, they access at least one other file in said memory;

a first password file in said memory that is accessible only to said issuer/owner, which contains data and which is accessed by said issuer/owner prior to said issuer/owner gaining access to said plurality of executable files;

a second password file that is accessible only to said holder, which contains data and which is accessed by said holder prior to said holder gaining access to files in said plurality of executable files; and a third password file that is accessible only to said service provider, which contains data and which is accessed by said service provider prior to said service provider gaining access to files in said plurality of executable files.

2. In connection with a smartcard issued by a first party, where the smartcard includes an operating system having a tree-like file structure that begins with a directory-file with attributes that are controlled solely by said party, a plurality of files, forming part of the tree-like structure and each having file attributes that are controlled solely by said first party, which files are executable files in the sense that, when referenced, they access, or access and alter, data in a file in said memory, and a password file that is accessible only to said first party and is used to confirm identity of said first party before granting access by said first party to said executable files, a method for installing in said smartcard a second party interaction means to allow a second party access to at least some of said files, the method comprising the steps of:

establishing communication between the smartcard and said first party;

executing a log-in protocol between the smartcard and said first party, employing the data contained in said password file;

communicating to said first party a request for installation of a said second party interaction means on said smartcard;

said first party establishing a user password file in said smartcard, with said user password file arranged to form part of said tree-like structure;

said first party inserting data into said user password file; and said first party changing file attributes of said user password file to make it accessible to said second party.

3. The method of claim 2 further comprising a step of informing said second party of the data stored in the user password file.

4. The method of claim 2 further comprising a step, executed by said first party following said step of communicating to said first party a request for installation of confirming with said second party that the request for installation of said second party interaction means should be fulfilled.

5. The method of claim 2 wherein said communication is employing a telecommunication network.

6. A method for a party to communicate with a personal information device comprising the steps of:

establishing communication between said party and said personal information device;

the personal information device authenticating the party through a first challenge-response communication;

the party authenticating the personal information device through a second challenge-response communication; and a holder of the personal information device being authenticated to the personal information device through a challenge-response communication.

7. A method for a party to communicate with a personal information device comprising the steps of:

the personal information device authenticating the party through a first challenge-response communication; and the party authenticating the personal information device through a second challenge-response communication;

where the step of the personal information device authenticating the party comprises the steps of:

the personal information device sending a challenge sequence that includes ID information and a first data string;

the party encrypting the first data string and sending the encrypted string to the personal information device, where the key used to encrypt the first data string is based on the ID information sent by the personal information device; and the step of the party authenticating the personal information device comprises the steps of:

the party sending a challenge sequence that includes a second data string;

the personal information device encrypting the second data string and sending the encrypted second data string to the party, where the encryption key used for encrypting the second data string is pre-stored in the personal information device; and the party confirming the authenticity of the personal information device by virtue of the encryption key used to encrypt the second data string; and the party authenticating the personal information device by virtue of the encryption key used to encrypt the second data string.

8. The method of claim 7 where the first and the second data strings comprise random sequences.

9. The method of claim 7 where the first and the second encryption keys are the same.

* * * * *